United States Patent [19]

Ruckert et al.

[11] Patent Number: 5,826,856
[45] Date of Patent: Oct. 27, 1998

[54] TAP FITTING WITH BELLOWS-TYPE SEAL

[75] Inventors: Heinz-Juergen Ruckert, Grossniedesheim; Alois Illy, Limburgerhof; Hans-Georg Stock, Ludwigshafen, all of Germany

[73] Assignee: KSB Aktiengesellschaft, Frankenthal, Germany

[21] Appl. No.: 793,072

[22] PCT Filed: Jul. 20, 1995

[86] PCT No.: PCT/EP95/02860

§ 371 Date: Feb. 18, 1997

§ 102(e) Date: Feb. 18, 1997

[87] PCT Pub. No.: WO96/06295

PCT Pub. Date: Feb. 29, 1996

[30] Foreign Application Priority Data

Aug. 18, 1994 [DE] Germany .......................... 44 29 300.3

[51] Int. Cl.⁶ .................................................. F16K 31/00
[52] U.S. Cl. ........................ 251/335.3; 251/356; 251/267
[58] Field of Search ................. 251/335.3, 356, 251/267

[56] References Cited

U.S. PATENT DOCUMENTS

| 490,589 | 2/1893 | Massey, Jr. . |
| 2,317,422 | 4/1943 | Thomsen ............................... 251/335.3 |
| 2,912,867 | 11/1959 | Gallant .................................. 251/335.3 |
| 4,166,607 | 9/1979 | Webb . |
| 5,178,365 | 1/1993 | Bartoschek et al. .................. 251/335.3 |

FOREIGN PATENT DOCUMENTS

| 2184143 | 11/1973 | France . |
| 2187081 | 1/1974 | France . |
| 2511471 | 2/1983 | France . |
| 2225520 | 12/1972 | Germany . |
| 74 10 963 | 3/1974 | Germany . |
| 75 31 347 | 10/1975 | Germany . |
| 2507031 | 5/1976 | Germany . |
| 186340 | 9/1936 | Switzerland . |
| 796604 | 1/1981 | U.S.S.R. . |
| 1417343 | 12/1975 | United Kingdom . |
| 2012394 | 4/1978 | United Kingdom . |

*Primary Examiner*—A. Michael Chambers
*Attorney, Agent, or Firm*—Evenson, McKeown, Edwards & Lenahan, P.L.L.C.

[57] ABSTRACT

The invention concerns a tap fitting in which the gap between the tap spindle and the spindle lead-in in the housing is sealed off by means of a bellows-type seal. The end of the seal nearest the housing is connected to a sleeve which is sealingly mounted in the housing.

9 Claims, 3 Drawing Sheets

TAP FITTING WITH BELLOWS-TYPE SEAL

The invention relates to a tap-fitting housing according to the precharacterizing clause of the main claim.

BACKGROUND OF THE INVENTION

Tap fittings usually have an actuation spindle, with the aid of which a closing element within the tap-fitting housing can be changed in its position. In the case of lift valves, irrespective of whether turning or rising spindles are involved, one end of the bellows is usually connected to the closing element and the other end of the bellows is fastened in a sealing manner within the housing. The bellows is intended to prevent a medium within the housing from passing through a housing opening surrounding the spindle.

Different means are known for fastening the end of the bellows on the housing side. GB-A-2 012 394 discloses so-called support rings, which are clamped by their outer diameter in a sealing manner between a tap-fitting housing and a cover closing the tap-fitting housing. On the side of the support ring facing the shut-off member, the bellows is welded on in a sealed manner. The shut-off member, actuation spindle, bellows and support ring are inserted as a prefabricated structural unit into the tap-fitting housing from outside. By means of screwing elemets and additional seals, the support ring is subjected to a pressing and sealing action between the housing and the cover. However, since these seals and the screwing elements have a plastic settling behaviour, the prestressing may be lost over the course of time. To be assured of a good seal of the housing, it is therefore essential to check the screwing elements from time to time for their prestressing and to retighten them if need be. To avoid this problem, it is also known to weld the end of the bellows on the housing side directly to the housing cover. Then, however, the housing cover nevertheless has to be braced against the housing in a sealing manner by means of a separate flat gasket with the aid of screwing elements, for example cover screws. Even then, the cover screws and their prestressing have to be checked from time to time in order to ensure adequate sealing tightness. It is also known to weld the housing cover to the housing. The welding of the end of the bellows on the housing side onto the housing covers is to this extent not entirely unproblematical, since here the weld has to be provided in a region of a transition between a small diameter and a large diameter and therefore the positioning of the welding torch requires particular care.

SUMMARY OF THE INVENTION

The invention is based on the problem of ensuring for tap-fitting housings sealed by bellows a reliable and simple installation of the bellows. The solution to this problem provides that the end of the bellows on the housing side is connected in a sealed manner to a sleeve surrounding the spindle. With approximately equal diameters, the sleeve can be welded very simply to the end of the bellows on the housing side, it being possible for this to be performed with the aid of a simple device. The outside diameter of the sleeve is in this case dependent on the installation conditions, the installation equipment and the loading situation of the bellows and also the dimensions of the bellows resulting from this.

In the cases in which the spindle with bellows attached thereto is led through the housing opening to be sealed, the sleeve usually has the same outside diameter as the bellows, but, for the purpose of more simple installation, will have a somewhat greater diameter than the bellows. However, in cases in which installation is performed from the inside of the housing, the sleeve may also have a smaller outside diameter than the bellows. This is dependent on the types of installation used and on the given conditions with respect to space.

According to one refinement of the invention, the sleeve can be introduced into the housing in a sealing manner. This may be performed, for example, by compressing a rim of the sleeve with the surrounding part of the housing or by providing welding seals. Further refinements of the invention provide that a sealant is arranged between the housing and the sleeve or that the sleeve is pressed into the housing. The sealing effect may in this case be achieved by interposing sealing elements, arranging a liquid and within certain limits curable sealant between the sleeve and the associated housing seat or other known sealing methods.

According to a further refinement of the invention, the sleeve can be brought into the appropriate position of the tap-fitting housing from the outside of the housing or the inside of the housing. If, for example, a spindle with bellows fastened thereto is introduced into the interior of the housing from outside through a housing opening, the sleeve will then have a slightly larger outside diameter, by which it bears in sealing contact in a correspondingly adapted housing region.

Another refinement of the invention provides that the sleeve is held by a clamping element. For this purpose, the sleeve may have a space for receiving a clamping element. With the aid of the clamping element, the sleeve can be held in the appropriate position at its installed location. The clamping element itself may be a rigid or yielding component, with the aid of which there is a pressing sealing effect from the clamping element on the sleeve and against the surrounding wall surface of the housing. This may also include the wall surface which bounds the space within the sleeve with respect to the surrounding wall surface of the housing.

According to a further refinement of the invention, the clamping element is designed as a thrust ring. This thrust ring may, for example, be installed after a connection has been established between a spindle and a closing element within a housing. In such a case, the end of the bellows on the closing side would already be attached to the spindle and the connection between the end of the spindle and the closing element could take place within the housing, for example by screwing. The end of the bellows on the housing side would in this case be connected to the sleeve, which is pushed into the housing or into a housing cover, but the sleeve itself would still be arranged loosely in the housing. Once it has been installed between the spindle and the closing element and the sleeve has been arranged at its intended location, the thrust ring can be pressed into the space within the sleeve, in the housing or in the housing cover. The space at the sleeve may be formed by a thin-walled cylinder portion which is attached to the sleeve at the end face. A thrust ring to be pressed therein would expand the wall surface of this space, to increase the outside diameter thereby in a limited region and consequently obtain the necessary pressing action between the sleeve part and the surrounding housing. The pressing action accomplishes a reliable sealing effect between these two parts and at the same time also corresponding torsional fixing. Since the thrust ring does not come into contact with the medium flowing through, it may also be made of a high-strength normal-grade steel. Its high strength has the advantage that there is built up within the thrust ring a high compressive stress, which acts as it were as an elastic spring and consequently accomplishes an elastic pressing action of the wall surface against the surrounding housing. This may be of great significance, particularly in the case of cyclic stress.

According to another refinement of the invention, there is arranged in the spindle lead-through a sealing element which bears against the end face of the sleeve remote from the bellows and surrounds the spindle. By means of a further refinement, a pressure-exerting element acting on the sealant may be provided. With the aid of this sealant, it is ensured that no corrosive media can reach the region of the sleeve or its thrust ring, for example from outside the housing. Equally well, the pressure-exerting element interacting with the sealant may also be used as a so-called emergency stuffing box, including for those operating cases in which there are particularly hazardous media or else sensitive media within the tap housing. Should it not be possible to stop the plant in the possible event of a bellows rupturing, the emergency stuffing box could be used to end a process which is in progress before the plant is switched off for repair purposes.

According to another refinement of the invention, the tap-fitting housing is designed as one part. This particularly resistant type of housing together with the design according to the invention produces a particularly reliable tap fitting, with a minimum of sealing surfaces.

BRIEF DESCRIPTION OF THE DRAWINGS

An exemplary embodiment of the invention is represented by the example of a one-part tap-fitting housing. In the drawing.

DETAILED DESCRIPTION OF PREFERRED EMBODIMENTS

Figure 1:
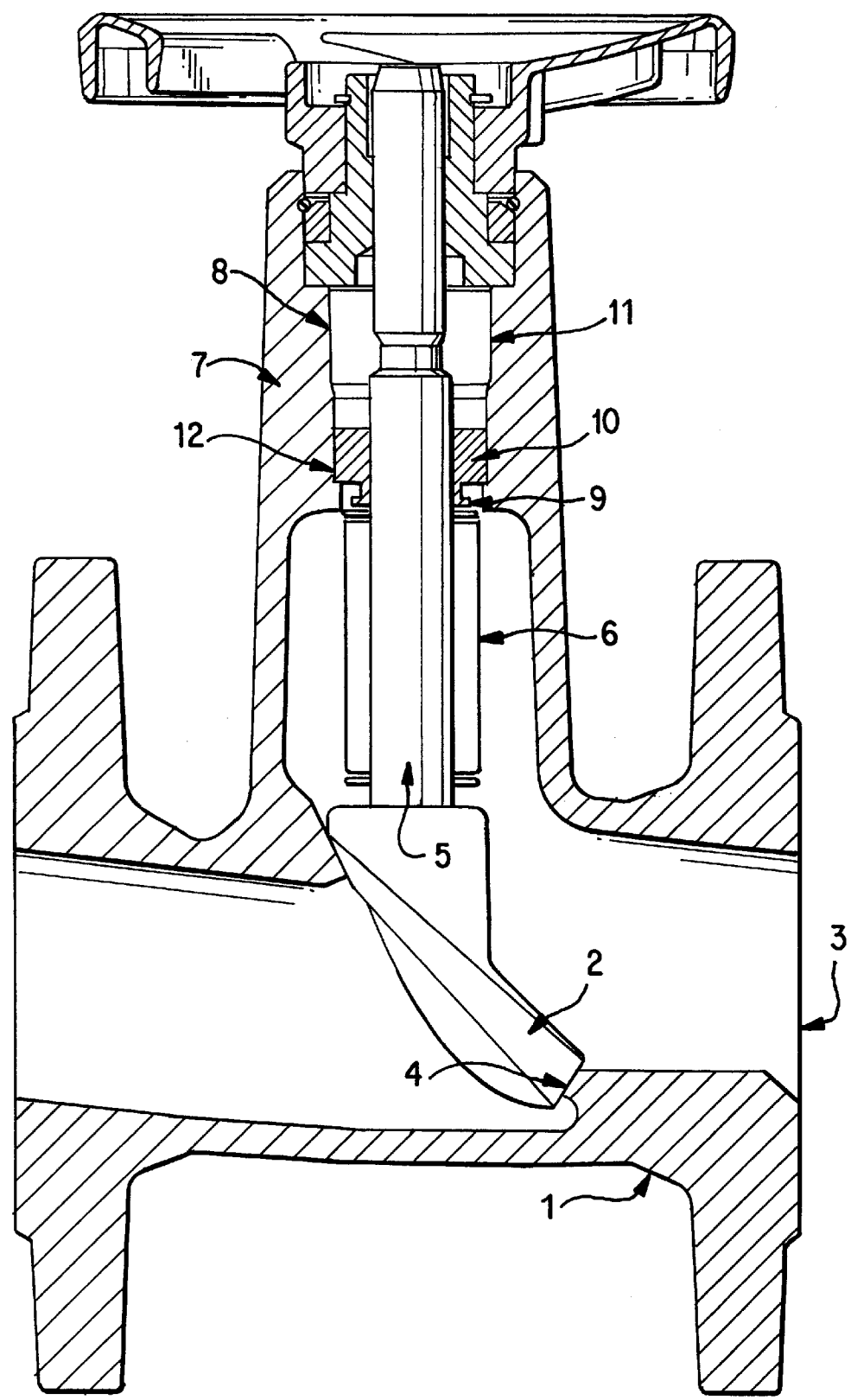
FIG. 1 shows a sleeve presed into a housing.

In FIG. 1, a one-part tap-fitting housing 1 is shown. The closing element 2 arranged therein can be placed into the housing seat 4 through a housing opening 3, which can be connected to a pipeline. The tap-fitting spindle 5, with bellows 6 fastened thereto in a sealing manner in the region of the closing element 2, is installed from outside through the housing neck 7. The latter has an inner contour 8 which is graduated in diameter and dimensioned such that the spindle 5 with welded-on bellows 6 and sleeve 10 welded onto the end 9 of the said bellows on the housing side can be pushed into the housing 1. The diameters 11 and 12 of the inner contour 8 of the housing neck 7 are chosen according to the connecting technique used between the spindle 5 and the closing element 2. If the spindle 5 is screwed to the closing element 2, the screwing is performed with the closing element 2 lying in the housing seat 4. Then, with the bellows 6 extended, the sleeve 10 is located in the region of the inner contour 11 and the spindle 5 can be screwed into the closing element 2 without any problem, with the bellows 6 turning along with the said spindle. The sleeve 10 and the bellows 6 have sufficient clearance within the inner contour 8 to be able to execute the turning motion. After completion of the connection and with the closing element 2 aligned within the valve seat 4, the sleeve 10 can be pressed into the diameter region 12, to be precise in such a way that the bellows is itself mounted in a torsion-free manner within the housing 1.

In the case of a type of housing designed for example as two parts, in which the housing can be closed by a cover, it is possible without any problem to arrange the sleeve 10 in a sealing manner within a cover part then used. Depending on type, the sleeve can in that case be pressed into the cover from inside or from outside.

By appropriate choice of the fits between the sleeve 10 and the diameter region 12, a sealing and torsionally resistant pressing action takes place when pressing in the sleeve 10. As an additional safeguard in mass production, an additional sealant or adhesive may be used between the sleeve 10 and the diameter region 12.

Figure 2:
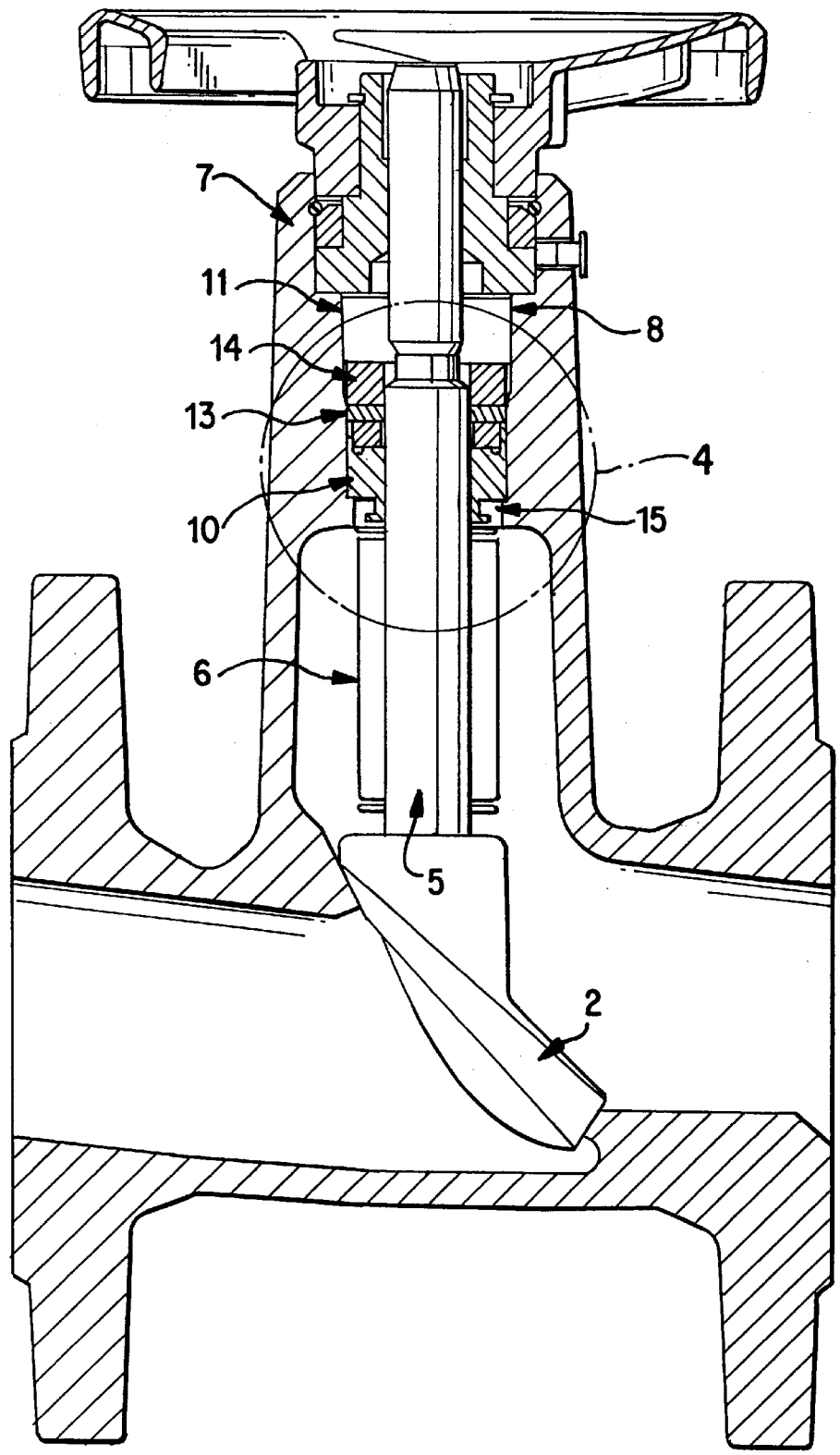
FIG. 2 shows a sleeve subjected to pressing action with the aid of a thrust ring and FIGS. 3 and 4 show enlarged details of the fastening of the sleeve.

Another way of exerting pressure on the sleeve 10 is represented in FIG. 2. There is also a kind of emergency stuffing box additionally arranged at the end of the sleeve 10 on the side remote from the bellows 6. This emergency stuffing box comprises a sealing ring 13 which surrounds the spindle 5 and can be subjected to pressing action by a pressure-exerting element 14 arranged in the region of the diameter 11 of the inner contour 8. This prevents any condensate which may form within the housing neck 7 getting to the sleeve 10.

Figure 3:
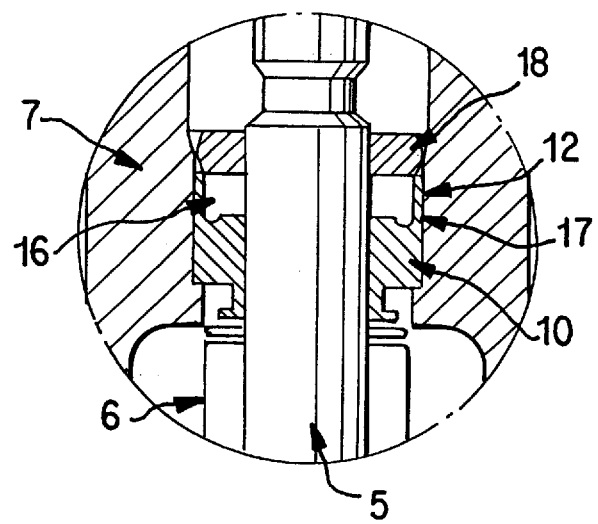

The sleeve 10, circled in FIG. 2 as detail X, is shown in FIG. 3 in an enlarged representation. The representation shows the sleeve 10 in the preinstallation position. The outside diameter of the sleeve 10 is dimensioned such that the sleeve 10, with the bellows 6 welded to it, and the spindle 5, in turn welded on it, can rotate freely in the diameter region 12. On account of the rotation permissible here, the spindle 5 can be screwed into the closing element 2.

FIG. 3 further reveals that, on the side of the sleeve 10 remote from the bellows 6, the end face of the sleeve is provided with a space 16. The latter is separated from the housing neck 7 by a thin wall 17. The wall 17 may also be considered as a cylindrical projection protruding beyond the end face of the sleeve. A clamping element 18, which is designed here as a pressure-exerting element and may be of one or more parts, is dimensioned such that, when it is pressed into the space 16, it presses the wall surface 17 in a sealing manner against the diameter region 12 of the housing neck 7. This way of establishing a connection requires less force to be exerted than if the sleeve 10 has to be pressed over its entire length into the diameter region 12. Furthermore, with this way of fixing and sealing the sleeve within the housing neck 7, a reliable sealing effect and secure torsional fixing of the sleeve 10 is accomplished at a desired point in time. The pressure-exerting element 18 may consist of a high-strength material and, in the installed state, has a high internal compressive stress. Acting as it were as a spring element, this accomplishes an elastic pressing action of the wall surface 17 against the diameter region 12. This is of great significance, particularly in the case of cyclic stresses of the tap fiting, and prevents possible leaking or loosening of this connection.

Figure 4:
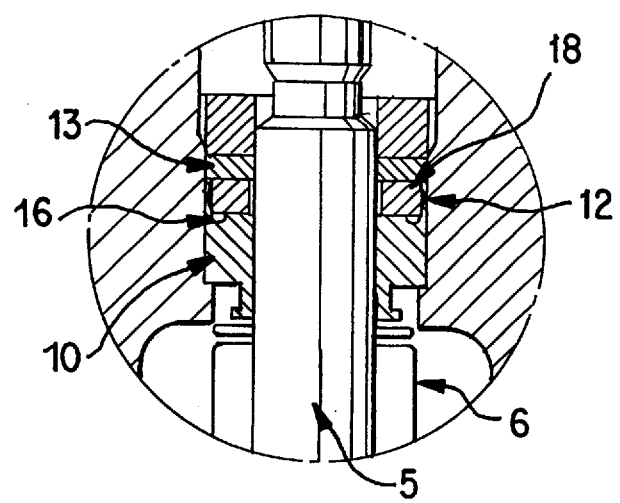

FIG. 4 shows the sleeve 10 in the final installed position. The thrust ring 18 has been pressed into the clearance 16 and produces by its oversized outer diameter a previously described pressing action in the region 12. To protect against corrosive condensate, which may possibly occur, the pressure-exerting element 18 may also be secured by the seal 13.

I claim:

1. A tap fitting comprising a housing with a neck, a spindle arranged in the housing, a closing element arranged on the spindle, a spindle lead-through opening in the housing, a bellows arranged to seal the spindle lead-through opening, one end of said bellows adjacent the housing being connected in a sealed manner to a sleeve surrounding the spindle, said sleeve extending into the housing and being arranged therein in sealing contact with the housing, and a clamping element for holding the sleeve, wherein said sleeve has an annular space on an end face remote from the bellows, said space being arranged such that it is separated from the housing neck by a thin wall, and said clamping element being pressed into said annular space.

2. A tap fitting according to claim 1, wherein said clamping element is a pressure-exerting element.

3. A tap fitting according to claim 2, wherein said clamping element presses the surface of the thin wall in a sealing and fixing manner against the housing neck.

4. A tap fitting according to claim 1, wherein a sealant is arranged between the housing and the sleeve.

5. A tap fitting according to claim 1, wherein said sleeve is pressed into the housing.

6. A tap fitting according to claim 1, wherein said sleeve can be introduced from the outside of the housing or the inside of the housing.

7. A tap fitting according to claim 1, wherein a sealing element is arranged in the spindle lead-through opening, said sealing element bearing against the end face of the sleeve and surrounding the spindle.

8. A tap fitting according to claim 7, further comprising a pressure-exerting element acting on the sealing element.

9. A tap fitting according to claim 1, wherein said housing is a unitary, one-piece housing.

\* \* \* \* \*